United States Patent [19]

Robertson

[11] 4,444,996
[45] Apr. 24, 1984

[54] END CAPS FOR TELEPHONE CABLES AND METHOD FOR HERMETICALLY SEALING A CABLE END

[75] Inventor: Thomas A. Robertson, Armdale, Canada

[73] Assignee: Plastics Maritime Ltd., Halifax, Canada

[21] Appl. No.: 370,685

[22] Filed: Apr. 22, 1982

[51] Int. Cl.³ .................. H02G 15/04; H02G 1/14
[52] U.S. Cl. ............................ 174/74 A; 29/858; 156/48; 174/10; 174/76
[58] Field of Search ............ 174/74 A, 76, 10, 79; 29/857, 858; 156/48

[56] References Cited

U.S. PATENT DOCUMENTS

| | | | |
|---|---|---|---|
| 2,792,441 | 5/1957 | Platow | 156/48 X |
| 2,967,795 | 10/1961 | Bollmeier et al. | |
| 3,290,194 | 12/1966 | Gillemot | 156/48 |
| 3,519,728 | 5/1970 | Gillemot | |
| 3,590,139 | 6/1971 | Gillemot | |
| 3,879,574 | 4/1975 | Filreis et al. | 174/76 |
| 4,025,717 | 5/1977 | Whittingham | 174/76 X |
| 4,194,082 | 3/1980 | Campbell | |
| 4,221,924 | 9/1980 | Gabriel | |
| 4,222,801 | 9/1980 | Gold | 156/48 X |
| 4,332,975 | 6/1982 | Dienes | 174/76 |

FOREIGN PATENT DOCUMENTS 1963730 6/1971 Fed. Rep. of Germany ........ 156/48

OTHER PUBLICATIONS

Schleyer, J., "Sealing the Ends of Communications Conduit Cables for Transportation and Laying"; Siemens Rev. XXXVIII (1971) No. 1, pp. 19-2.

Primary Examiner—J. V. Truhe
Assistant Examiner—Morris H. Nimmo
Attorney, Agent, or Firm—Bachman and LaPointe

[57] ABSTRACT

A capping member and method are provided for hermetically sealing a cable end; in a particular embodiment the capping member includes a generally tubular, rigid main body, closed at one end and with a plurality of inwardly deflectable fingers extending from the other end; an injection port, which is suitably located in the closed end, permits injection of sealing material under pressure into the void between the capping member and a cable end over which it is telescoped; in this way the void is substantially filled so that entry of moisture into the cable is prevented.

11 Claims, 9 Drawing Figures

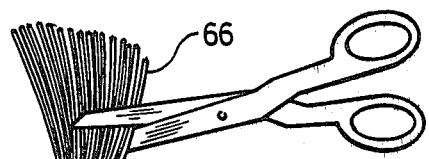
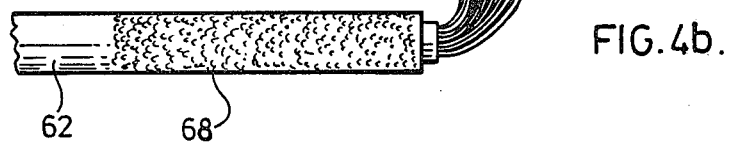
FIG.4b.
FIG.4c.
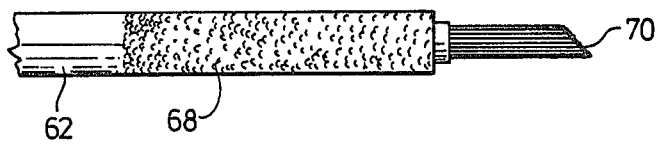
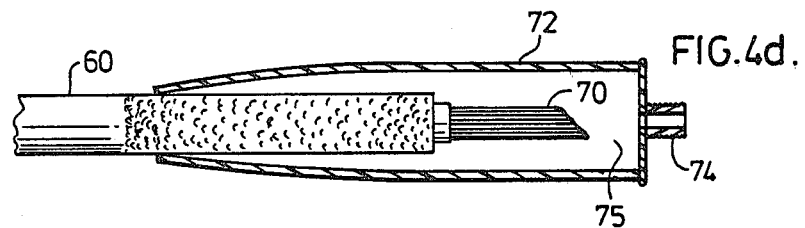
FIG.4d.
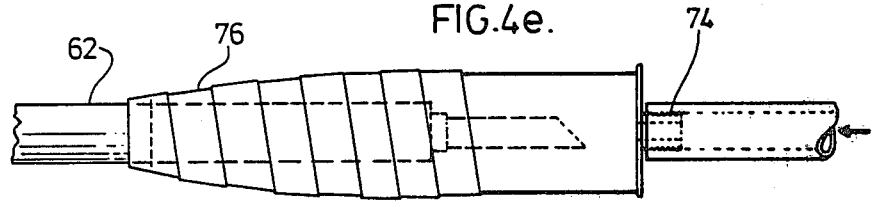
FIG.4e.
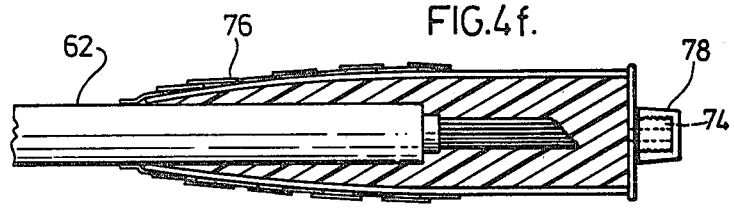
FIG.4f.

END CAPS FOR TELEPHONE CABLES AND METHOD FOR HERMETICALLY SEALING A CABLE END

BACKGROUND OF THE INVENTION (i) Field of the Invention

The invention relates to a capping member for use in sealing a cable end, to a method of sealing an end of a cable and to a sealed cable end.

(ii) Description of the Prior Art

When a communication cable, for example, a telephone cable, is installed a free end of the cable is maintained to accommodate any desired furture extension of the cable and the free end is capped to prevent entry of moisture and foreign matter into the cable.

One accessary for capping a cable end is described in U.S. Pat. No. 3,590,139, George W. Gillemot, issued June 29, 1971. The accessory of Gillemot has a main body which is tubular and closed at one end, the other end having integral tangs spaced about the periphery of the main body. The tubular body is telescoped over a cable end, the tangs are deflected into contact with the cable surface and are secured thereto with tape. The tubular body is disposed in an upright position and fluid potting compound is introduced into the upright body through the openings provided between the lateral edges of the tangs. The tubular body is suitably made transparent and the assembly is shaken to dislodge trapped air bubbles, during the introduction of the potting compound. the air bubbles being visible through the transparent wall of the body.

The Gillemot construction has several disadvantages outlined below.

Gillemot requires vertical positioning of the accessory for filling with potting compound, with the closed end of the accessory being in a lowermost position, and with good access to the openings defined between the tangs. In many cases these requirements are difficult and costly to achieve, particularly in the case of underground cable, and when, as is usual, a significant length of free cable end, typically more than one meter, is maintained, to allow for future extensions of the cable.

The requirement for transparency whereby air bubbles can be observed, severely restricts the polymer materials which can be employed to fabricate the accessory, and increases the cost since fillers cannot be used to reduce the amount of polymer material.

The need to rely on visual examination to locate air bubbles is unsatisfactory, particularly in that fine bubbles may not be observed, and air bubbles which are trapped between individual conductors of the cable, or between individual conductors and the cable sheathing, will not be observed.

Gillemot requires a significant spacing between adjacent tangs to provide large openings for the flow introduction of the potting compound into the accessory, this is especially apparent from FIG. 3 of the Gillemot U.S. Patent. In addition no means of closing these large openings is provided.

Probably the most serious disadvantage of Gillemot is that the flow introduction of potting compound under gravity, into the upright accessory is inadequate for access of the potting compound to all of the void space defined between the cable end and the accessory, and within the cable end and thus air pockets which may house moisture are maintained.

It is an object of this invention to provide a capping member for use in sealing a cable end which overcomes the afore-mentioned disadvantages.

It is a further object of this invention to provide a method of sealing a cable end which overcomes the afore-mentioned disadvantages.

SUMMARY OF THE INVENTION

In accordance with the invention a capping member for sealing a cable end includes an injection port for introduction of sealing material under pressure, whereby all void space in the capped cable end is filled and access of water or moisture into the cable end is prevented.

In accordance with one aspect of the invention there is provided a capping member for use in sealing a cable end comprising: an elongate protective enclosure adapted to be telescoped over a cable end to be sealed, the enclosure including a main body portion, a plurality of elongate inwardly deflectable fingers extending from a first end of said body portion, the fingers being inwardly deflectable to engage a cable over which said enclosure is to be telescoped, a closure wall at a second end of the body portion, remote from said fingers, and an injection port in the enclosure for injection of sealing material under pressure into the enclosure to occupy a space defined between an inner wall of the enclosure and the cable end.

In another aspect of the invention there is provided a method of sealing a cable end which comprises surrounding a terminal portion of the cable including the cable end with a capping member of the invention, a space being defined between an inner wall of the capping member and the terminal portion of the cable, deflecting the fingers of the capping member into contact with the cable at a position spaced inwardly from the cable end, binding the deflected fingers to the cable to secure said enclosure on said terminal portion, injecting sealing material under pressure, through the injection port of the capping member to occupy said space, and closing the injection port.

DESCRIPTION OF THE PREFERRED EMBODIMENTS (i) Capping Member

The capping member is suitably formed from a tubular member and preferably is fabricated from a polyethylene tube or pipe.

Suitably the fingers are integral with the main body and are formed in the polyethylene tube by cutting or shearing out material to define V-shaped slots.

In one embodiment the deflectable fingers are formed by first drilling holes in the polyethylene tube at spaced apart circumferential positions and then cutting or shearing out a V-shaped slot, with the apex of each V terminating in a drilled hole.

Preferably the tubular member is a rigid, non-flexible element, such that the main body portion of the capping member is substantially rigid, V-shaped slots being effective to render the fingers formed from the rigid tubular member deflectable.

It will be understood that the tubular member has an internal diameter greater than the external diameter of the cable end being capped. The deflectable fingers enable the capping member to be used for capping cables of different sizes.

Of course the fingers must have sufficient flexibility that they can be deflected towards each other to contact a cable being capped.

The injection port is most suitably disposed in the closure wall of the capping member, remote from the fingers. Conveniently the injection port has a threaded outer surface, whereby the port can be readily closed after injection of the sealing material, with a threaded cap.

The closure wall with the injection port can be welded to the tubular member by a plastic weld employing a hot plate weld system or the tubular member with the closure wall and injection port can be injection molded as a single unit.

(ii) Method of Capping

The method of the invention is applicable to the capping of communication cables in general. Particular cables to which the method may be applied include PIC Alpeth and PIC PAP.

In order to prepare the cable end for capping, the outer cable sheath is first removed employing a knife to score the outer cable sheath completely around the cable. Conveniently this scoring is carried out at a distance of about 10 cm. from the cable end, and the cable sheath is removed.

The outer surface of the sheath adjacent the sheath end is preferably rendered non-smooth, for example, by scuffing with a cording brush or other technique for abrading or roughening the sheath surface. Roughening of the sheath surface is desirable to ensure a good bond between the sealing material and the cable sheath. Suitably the roughening may be for a length of about 10 cm.

The inner sheath which frequently is an aluminium shield or terneplate is removed so that it is flush with the sheath end. In the case of cables having an inner core wrapper as in PAP (polyethylene/aluminium/polyethylene) cable, the core wrapper is removed, preferably leaving a short collar suitably of 1 to 1.5 cm. length extending from adjacent the sheath end. The collar serves to protect the conductors from the aluminium shield. Thereafter the binder ties securing the insulated conductors together are removed.

To complete the preparation of the cable end for capping it is found to be appropriate to bend the free exposed ends of the conductors extending from the sheath end, at right angles to the cable axis, and to cut the conductors parallel to the cable removing, say 5 cm. of conductor. When the bend in the conductors is removed, the conductor ends are staggered. The staggered arrangement of the conductor ends minimizes the possibility of electrical shorting.

A capping member of appropriate internal diameter is telescoped over the prepared cable end suitably until the free conductor ends are spaced a short distance from the closure wall, suitably of the order of 1 to 1.5 cm. It is found preferable not to abut the conductor ends against the closure wall, particularly since such abutment hinders the entry of sealing material through the injection port. The spacing also ensures the presence of adequate sealing material between the ends of the conductors and the closure wall.

The fingers are deflected until they engage the outer sheath of the cable, and a tape is used to bind the capping member on the cable end. Conveniently the tape is a friction tape and is lapped around the capping member starting on the main body and working towards the deflected fingers; in this way the open end, i.e., the finger end of the capping member is drawn tightly to the cable in a cone-shaped manner. The tape also closes the slots between the fingers of the capping member to prevent access of foreign matter. Suitably a vinyl tape is lapped over the friction tape.

Sealing material, in liquid form is injected through the threaded injection port under pressure to fill the void and after the injection a threaded cap is screwed onto the injection port to prevent any backflow of sealing material.

The injection under pressure ensures that all the void space is filled so as to seal the cable end against access of water or foreign material.

The sealing material may be any known material which can be cured or set from a liquid state to a solid state to provide a hermetic seal. Sealing materials capable of forming a strong bond on solidifying are particularly preferred. Suitable sealing materials include epoxy resins and polycarbonates, however, an especially preferred sealing material is a polyurethane-forming composition comprising a mixture of an organic di- or polyisocyanate and an organic material containing active hydrogen atoms, for example, a polyol, which will react with the isocyanate to form a urethane. Such polyurethane-forming compositions have the additional advantage that the isocyanate can act as a scavenger for any moisture present in the cable end, by reacting with it.

While particular reference has been made to the use of a polyethylene tube or pipe, it will be recognized that tubes or pipes of other plastic materials, for example, polyvinyl chloride can be used, and also that the pipes other than cylindrical pipes can be used. It is further to be understood that the invention contemplates the use of inert filler or pigment in the plastic material, which reduces the cost.

BRIEF DESCRIPTION OF THE DRAWINGS

The invention is illustrated in particular and preferred embodiments by reference to the accompanying drawings, in which.

DESCRIPTION OF THE PREFERRED EMBODIMENTS WITH REFERENCE TO THE DRAWINGS

Figure 1:
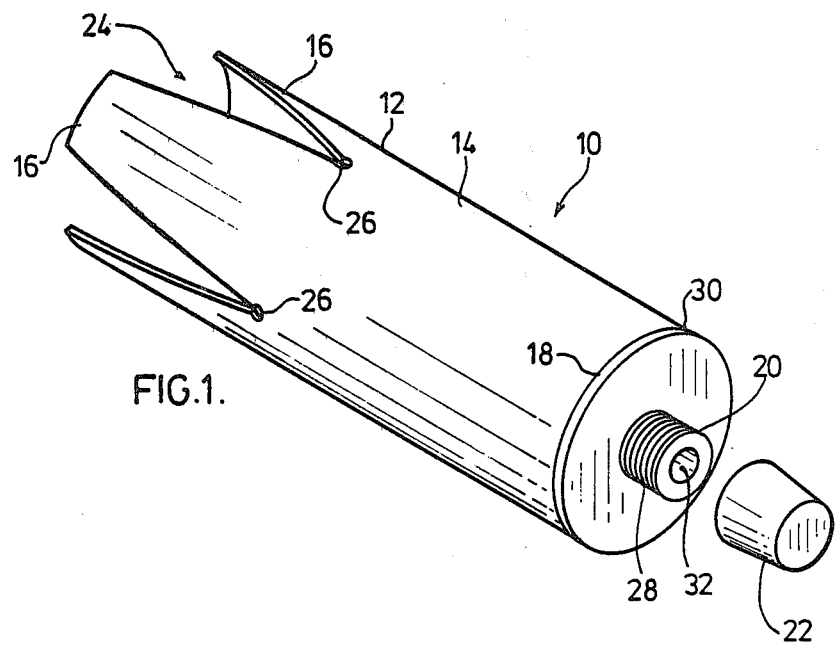
FIG. 1 shows one embodiment of a capping member assembly of the invention.

With further reference to the drawings, FIG. 1 shows an assembly 10 including a capping member 12 having a rigid main body 14, a plurality of fingers 16, a closure wall 18 with an injection port 20, and a threaded cap 22.

The fingers 16 are separated by V-shaped slots 24, the apex of each slot 24 merging with a hole 26.

Closure wall 18 is joined to body 14 by a plastic weld 30.

Injection port 20 which extends from closure wall 18 includes a threaded surface 28 and an injection passage 32 passes through port 20 communicating with the interior of body 14.

Threaded cap 22 is adapted to threadedly engage the threaded surface 28 of injection port 20.

Figure 2:
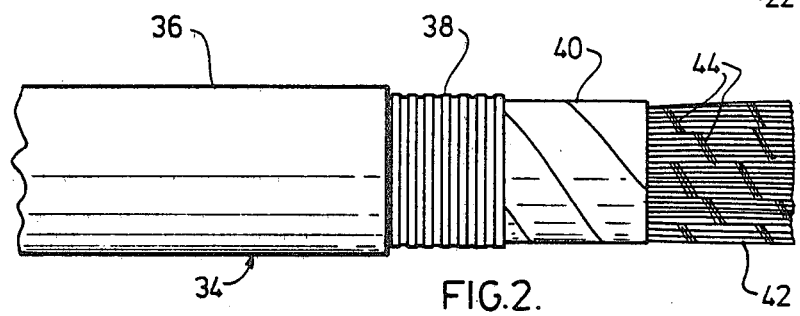
FIG. 2 illustrates schematically the structure of a PIC Alpeth cable which can be capped by the method of the invention.
Figure 3:
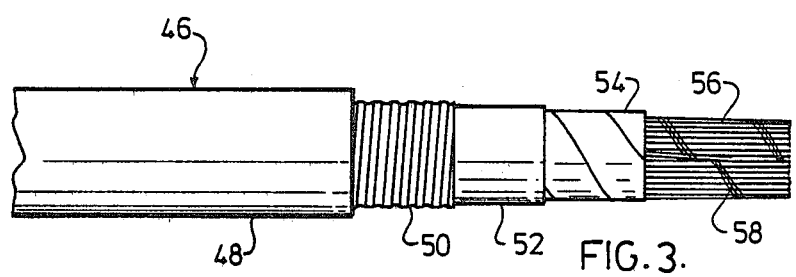
FIG. 3 illustrates schematically the structure of a PIC PAP cable which can be capped by the method of the invention.

FIGS. 2 and 3 illustrate schematically the general construction of particular cables which can be capped by the method of the invention.

With reference to FIG. 2, there is shown the general structure of a PIC Alpeth cable 34 having an outer sheath 36 which is typically of polyethylene, a shield 38 typically of aluminium, a core wrapping 40 which suitably may be of Mylar (trade mark of E. I. Du Pont de Nemours & Co. for a polyester film) and insulated conductors 42 held together by binder ties 44.

With particular reference to FIG. 3 there is shown schematically the general structure of a PIC PAP cable 46 having an outer sheath 48 suitably of polyethylene, a shield or terneplate 50 suitably of aluminium, an inner sheath 52 suitably of polyethylene, a core wrapping 54 suitably of Mylar and insulated conductors 56 bound together by binder ties 58.

Figure 4A:
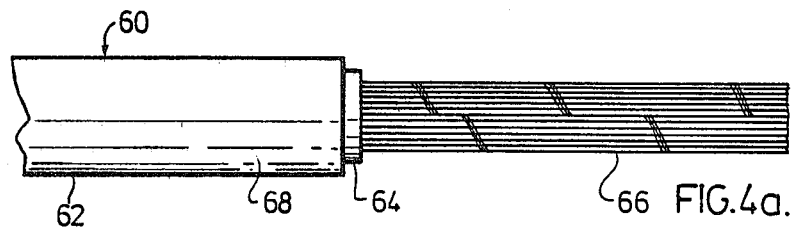
FIG. 4 illustrates schematically stages in the preparation and capping of a PIC Alpeth cable, the stages being identified as (a), (b), (c), (d), (e) and (f).

With further reference to FIG. 4, there is illustrated schematically several stages in the preparation and capping of a cable end.

FIG. (4a), shows a cable 60 having an outer sheath 62, a collar 64 and insulated conductors 66. The outer sheath 62 includes a scuffed portion 68 extending from adjacent collar 64.

FIG. (4b), shows the cable 60 of FIG. (4a) with the free ends of conductor 66 bent at right angles to the axis of cable 60 for cutting of the conductors 66.

FIG. (4c) shows the cable resulting from stage (b) with the conductors 66 restored to their position along the axis of the cable 60, and defining a staggered bundle 70.

FIG. (4d) illustrates schematically the cable 60 resulting from step (c) with a capping member 72 telescoped thereon. Fingers 73 of capping member 72 are shown schematically in contact with outer sheath 62. Capping member 72 includes an injection port and a void 75 is defined in the interior of capping member 72.

FIG. (4e) shows a subsequent stage in which a wrapping 76 of tape has been applied about a portion of the main body of capping member 72 and about the fingers 73. Injection of sealing material through injection port 74 is indicated by the direction of the arrow shown in the drawing.

With reference to FIG. (4f), the injection has been completed and injection port 74 is closed by threaded cap 78. Sealing composition 80 fills the void 75 within the capping member 72.

I claim:

1. A capping member for sealing a cable end comprising:
    an elongate protective enclosure adapted to be telescoped over a cable end to be sealed,
    said enclosure including a cylindrical, preformed main body portion, a plurality of elongate inwardly deflectable fingers extending from a first end of said body portion, said fingers being inwardly deflectable to engage a cable over which said enclosure is to be telescoped,
    a closure wall at a second end of the body portion, remote from said fingers, and
    an injection port comprising a port member in said closure wall for injection of a solidifiable, liquid sealing material under pressure into said enclosure, to occupy a space defined between an inner wall of the enclosure and the cable end and a cap adapted to close said port member.

2. A capping member according to claim 1, in which said injection port comprises a port member defined in said closure wall, said port member having an outer threaded surface, and including a threaded cap adapted to threadedly engage said threaded surface to close said injection port.

3. A capping member according to claim 2, in which said fingers and said main body portion are integrally formed in a substantially rigid tubular member, said fingers being separated by V-shaped slots in said tubular member such that said fingers have the necessary deflectability, and said main body portion being substantially rigid.

4. A capping member according to claim 3, wherein said tubular member is of polyethylene.

5. A method of sealing a cable end which comprises:
    surrounding a terminal portion of the cable including the cable end with a capping member which comprises:
    an elongate protective enclosure including a cylindrical, preformed main body portion, a plurality of inwardly deflectable elongate fingers extending from a first end of said body portion, and a closure wall at a second end of said body portion, remote from said fingers, and an injection port comprising a port member in said closure wall,
    a space being defined between an inner wall of the capping member and the terminal portion of the cable,
    deflecting the fingers of the capping member into contact with the cable at a position spaced inwardly from the cable end,
    binding the deflected fingers to the cable, to secure said enclosure on said terminal portion and completely close openings to the interior of said capping member, defined between adjacent fingers,
    injecting a solidifiable sealing material in a liquid state under pressure through the injection port of the capping member to occupy said space,
    closing the injection port with a cap adapted to close said port member, and
    allowing said sealing material to solidify to provide a hermetic seal.

6. A method according to claim 5, including a step of rendering an outer surface of the terminal portion of the cable non-smooth to promote adhesion of the sealing material to the cable.

7. A method according to claim 6, wherein said outer surface is rendered non-smooth by scuffing.

8. A method according to claim 7, wherein said sealing material is a polyurethane-forming composition.

9. A method according to claim 8, wherein the outermost end of the cable is spaced inwardly of the closure wall of the capping member.

10. A hermetically sealed cable end in which a terminal portion of a cable is surrounded by a capping member,
    said capping member comprising an elongate protective enclosure including a cylindrical, preformed main body portion, a plurality of elongate fingers extending from a first end of said body portion, said fingers being deflected inwardly in contacting relationship with said cable, a closure wall at a second end of said body portion remote from said fingers, an injection port comprising a port member in said closure wall and a cap adapted to close said port member,
    a plurality of turns of binding tape binding said fingers in said inwardly deflected configuration, said binding tape closing any access to the interior of said protective enclosure between the inwardly deflected fingers, a space defined between said terminal portion and said capping member being filled with a solid sealing material, said solid sealing material being formed by a solidification of a liquid composition injected through said injection port under pressure.

11. A sealed cable end according to claim 10, wherein said fingers are separated by V-shaped slots and said binding tape closes any access to the interior of said protective enclosure through said slots.

* * * * *